(12) United States Patent
Tsuzaki et al.

(10) Patent No.: US 11,515,932 B2
(45) Date of Patent: Nov. 29, 2022

(54) RELAY STATION, CONTROL STATION, SATELLITE COMMUNICATION SYSTEM, CONTROL CIRCUITRY AND COMPUTER READABLE MEDIUM

(71) Applicant: Mitsubishi Electric Corporation, Tokyo (JP)

(72) Inventors: Shogo Tsuzaki, Tokyo (JP); Katsuyuki Motoyoshi, Tokyo (JP); Shigenori Tani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/966,243

(22) PCT Filed: Mar. 29, 2018

(86) PCT No.: PCT/JP2018/013484
§ 371 (c)(1),
(2) Date: Jul. 30, 2020

(87) PCT Pub. No.: WO2019/186980
PCT Pub. Date: Oct. 3, 2019

(65) Prior Publication Data
US 2021/0050912 A1  Feb. 18, 2021

(51) Int. Cl.
*H04B 7/185* (2006.01)
(52) U.S. Cl.
CPC ................. *H04B 7/18513* (2013.01)

(58) Field of Classification Search
CPC ............ H04B 7/18513; H04B 7/18534; H04B 7/15542; H04B 7/0617; H04B 7/0452;
(Continued)

(56) References Cited

U.S. PATENT DOCUMENTS

| 6,950,418 B1 * | 9/2005 | Young | H04W 16/14 370/337 |
| 2003/0208693 A1 * | 11/2003 | Yoshida | H04L 67/28 726/26 |

(Continued)

FOREIGN PATENT DOCUMENTS

| EP | 2 059 059 A1 | 5/2009 |
| JP | 2006-148483 A | 6/2006 |

(Continued)

OTHER PUBLICATIONS

Partial European Search Report dated Jan. 22, 2021 in the corresponding European Patent Application No. 18912649.3.
(Continued)

*Primary Examiner* — Fred A Casca
(74) *Attorney, Agent, or Firm* — Birch, Stewart, Kolasch & Birch, LLP

(57) ABSTRACT

A terminal according to the present invention includes an array antenna including an aperture, and an antenna pattern calculation unit. The antenna pattern calculation unit calculates antenna patterns of the array antenna that divide the aperture to correspondingly orient each of the aperture divisions toward a plurality of relay stations when control frames are received, and orient the aperture toward one of the plurality of relay stations when a data frame is received.

5 Claims, 16 Drawing Sheets

(58) Field of Classification Search
CPC .. H04B 7/0626; H04B 7/0456; H04B 7/0413; H04B 7/0632; H04B 7/0639; H04B 7/024; H04B 7/0417; H04B 7/0695; H04B 7/043; H04B 7/0619; H04B 7/0469; H04B 7/04; H04B 7/0408; H04B 7/0697; H04B 7/0897; H04B 7/10; H04B 7/02; H04W 16/28; H04L 5/0048; H04L 5/0023; H04L 25/0204

See application file for complete search history.

(56) References Cited

U.S. PATENT DOCUMENTS

| | | |
|---|---|---|
| 2006/0035588 A1 | 2/2006 | Chapelle |
| 2006/0193351 A1* | 8/2006 | Kim ................... H04B 7/2656 370/538 |
| 2009/0219854 A1* | 9/2009 | Okuda ................ H04W 84/047 370/315 |
| 2009/0280797 A1 | 11/2009 | So et al. |
| 2010/0035620 A1 | 2/2010 | Naden et al. |
| 2011/0199959 A1 | 8/2011 | Fukuzawa et al. |
| 2012/0040607 A1 | 2/2012 | Yang et al. |
| 2014/0016541 A1* | 1/2014 | Kim ..................... H04L 5/0044 370/315 |
| 2016/0345189 A1* | 11/2016 | Miyagawa ......... H04B 7/18517 |
| 2017/0078920 A1* | 3/2017 | Li .......................... H04L 12/28 |

FOREIGN PATENT DOCUMENTS

| | | |
|---|---|---|
| JP | 2013-207522 A | 10/2013 |
| JP | 6165645 B2 | 7/2017 |

OTHER PUBLICATIONS

Office Action issued in corresponding Canadian Patent Application No. 3,092,433 dated Nov. 13, 2020.
Extended European Search Report dated May 10, 2021 in corresponding European Patent Application No. 18912649.3.
European Office Action dated Feb. 11, 2022 in corresponding European Application No. 18912649.3.

* cited by examiner

CONTROL FRAME

ADDITIONAL-RELAY-STATION AVAILABILITY NOTIFICATION

RELAY STATION ADDITION NOTIFICATION

RELAY STATION DISCONNECTION NOTIFICATION

RELAY STATION, CONTROL STATION, SATELLITE COMMUNICATION SYSTEM, CONTROL CIRCUITRY AND COMPUTER READABLE MEDIUM

FIELD

The present invention relates to a terminal, a relay station, a control station, and a satellite communication system including these.

BACKGROUND

In a conventional satellite communication system including a ground-based terminal and a plurality of satellites, the terminal includes a plurality of receiving antennas. Satellite multiple-input and multiple-output (MIMO) for simultaneous communication between the terminal and the plurality of satellites, provides communication at a higher speed by spatial multiplexing of a plurality of channels through use of beams that are formed by the antennas of the terminal.

Patent Literature 1 discloses a satellite communication system using satellite MIMO. Applied to this satellite communication system are a receiving-end equalizing method and a transmitting-end precoding method, which prevents or reduces a decrease in data transfer throughput that is caused by a difference between timings at which a terminal receives signals from satellites, or frequency errors of the satellites.

CITATION LIST

Patent Literature

Patent Literature 1: Japanese Patent No. 6165645

SUMMARY

Technical Problem

However, the satellite communication system described in Patent Literature 1 requires the terminal to always form beams for simultaneous communication with the plurality of satellites, so that antennas need to have a plurality of apertures. For this reason, circuitry of the terminal needs to be scaled up. Moreover, in order to communicate with the plurality of satellites, the terminal can use an array antenna and divide its aperture for forming a plurality of beams; however, dividing the aperture for formation of the plurality of beams causes a reduced aperture area per beam, thus problematically causing a reduction in beam gain.

The present invention has been made in view of the above, and an object of the present invention is to obtain a terminal that prevents an increase of a circuitry scale and prevents or reduces a decrease in beam gain.

Solution to Problem

To solve the problem and achieve an object, a terminal according to the present invention includes: an array antenna including an aperture; and an antenna pattern calculation unit to calculate antenna patterns of the array antenna, the antenna patterns including dividing the aperture to correspondingly orient each of the aperture divisions toward a plurality of relay stations when control frames are received and orienting the aperture toward one of the plurality of relay stations when a data frame is received.

Advantageous Effects of Invention

A satellite communication system according to the present invention can obtain the terminal that prevents an increase of a circuitry scale and prevents or reduces a decrease in beam gain.

DESCRIPTION OF EMBODIMENT

With reference to the drawings, a detailed description is hereinafter provided of a terminal, a relay station, a control station, and a satellite communication system according to an embodiment of the present invention. It is to be noted that this embodiment is not restrictive of the present invention.

Figure 1:
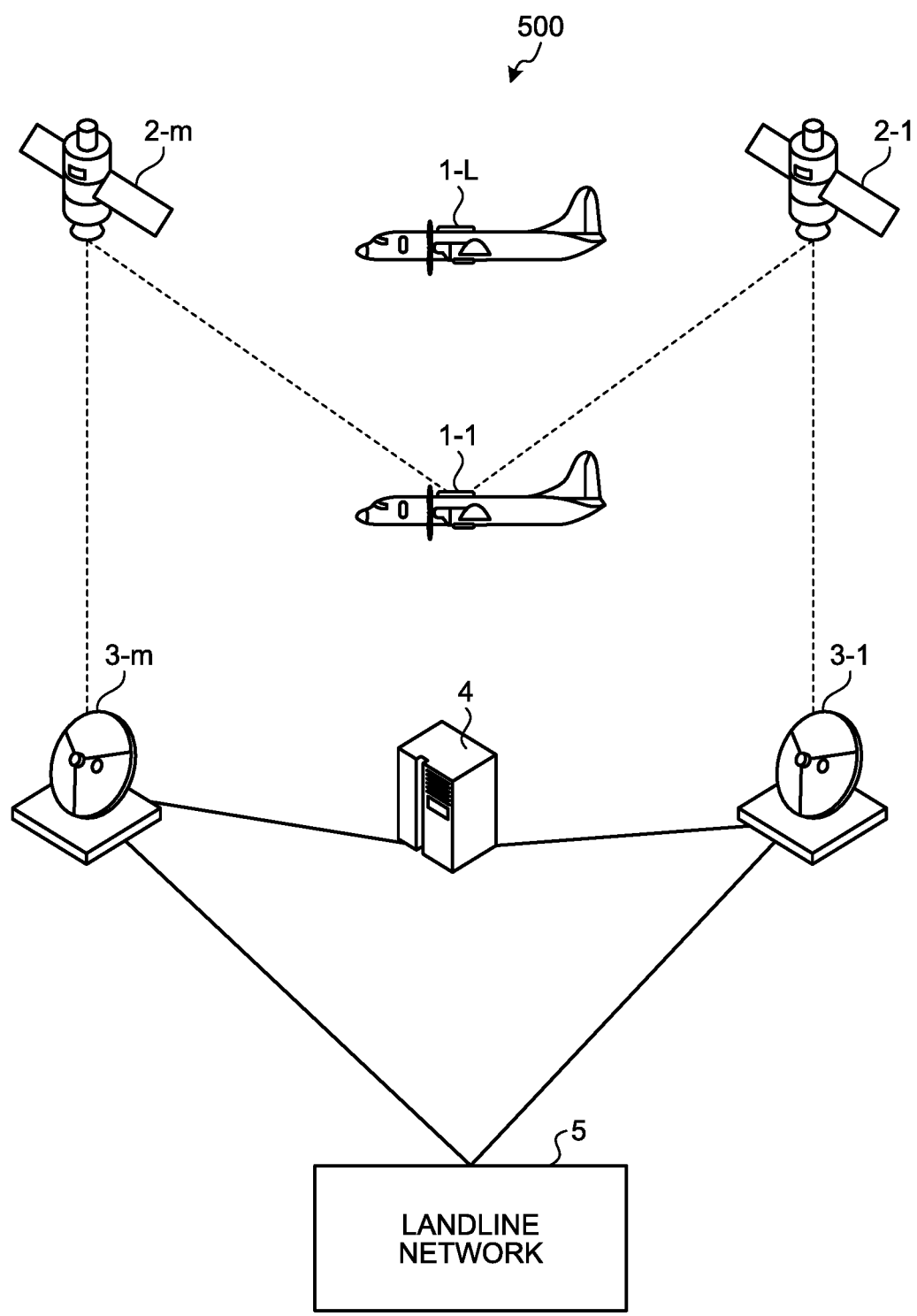
FIG. 1 illustrates a configuration example of a satellite communication system according to an embodiment.

Embodiment. FIG. 1 illustrates a configuration example of a satellite communication system according to the embodiment. The satellite communication system 500 includes terminals 1-1 to 1-L, relay stations 2-1 to 2-m, base stations 3-1 to 3-m, a control station 4, and a landline network 5. FIG. 1 illustrates the relay stations 2 where m is 2; however, it is to be noted that the relay stations are not limited to two in number in the present embodiment. When described without distinction, the relay stations 2-1 to 2-m are each referred to as relay station 2. Although FIG. 1 illustrates the base stations 3 where m is 2, the base stations are similarly not limited to two in number in the present embodiment. When described without distinction, the base stations 3-1 to 3-m are each referred to as base station 3. FIG. 1 illustrates the terminals 1 where L is 2; however, the terminals are not limited to two in number in the present embodiment. When described without distinction, the terminals 1-1 to 1-L are each referred to as terminal 1. The relay station 2 is also called a satellite. There is a one-to-one relationship between the number of relay stations 2 and the number of base stations 3.

The terminal 1 includes a receiving antenna and is connected to the relay station 2 by wireless communication. The relay station 2 and the base station 3 are connected by wireless communication. The base station 3 and the control station 4 are connected by wired communication. The base station 3 and the landline network 5 are connected by wired communication. While the present embodiment has the wired communication between the base station 3 and the control station 4 as well as between the base station 3 and the landline network 5, the communication is not limited to the wired communication and may be wireless. In the present embodiment, a medium that each device uses for wireless communication or wired communication, such as radio waves or light, is not particularly limited. In FIG. 1, broken lines each indicate the wireless communication, and full lines each indicate the wired communication.

Figure 2:
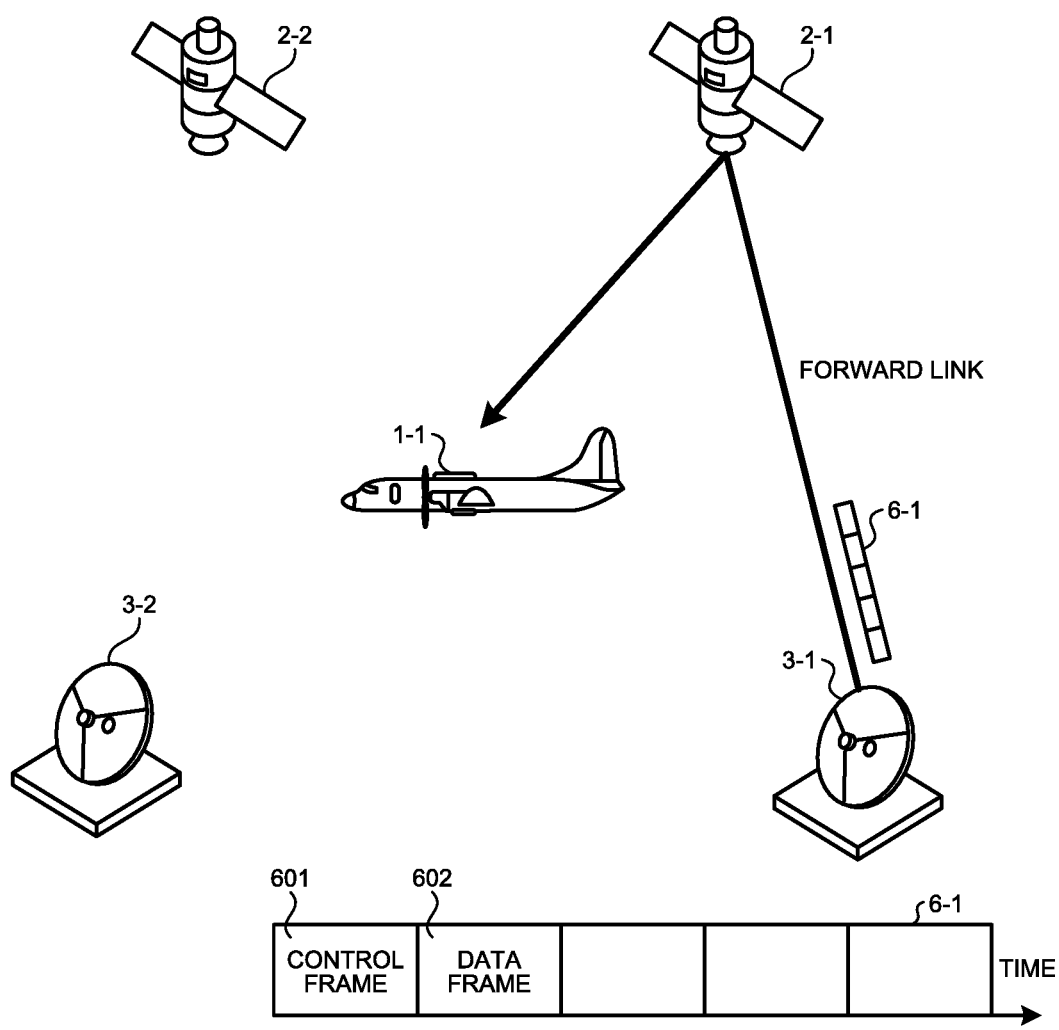
FIG. 2 illustrates reception of a signal by a terminal from a base station via a relay station according to the embodiment.

FIG. 2 illustrates reception of a signal by the terminal 1 from the base station 3-1 via the relay station 2-1 according to the embodiment. The terminal 1-1 receives the signal 6-1 being sent from the base station 3-1 via the relay station 2-1. In the present embodiment, the reception of the signal by the terminal 1 from the base station 3 via the relay station 2 is referred to as a forward link. In order to have an increased forward link throughput, the terminal 1 can receive a signal not only from the relay station 2-1, but also from the relay station 2-2. The signal 6-1 includes a control frame 601 and a data frame 602. The control frame 601 is a frame including information that is used for communication control, such as a source Internet Protocol (IP) address, a destination IP address, and an acknowledgement (ACK), among others. The data frame 602 is a frame including data that the terminal 1 requests.

Figure 3:
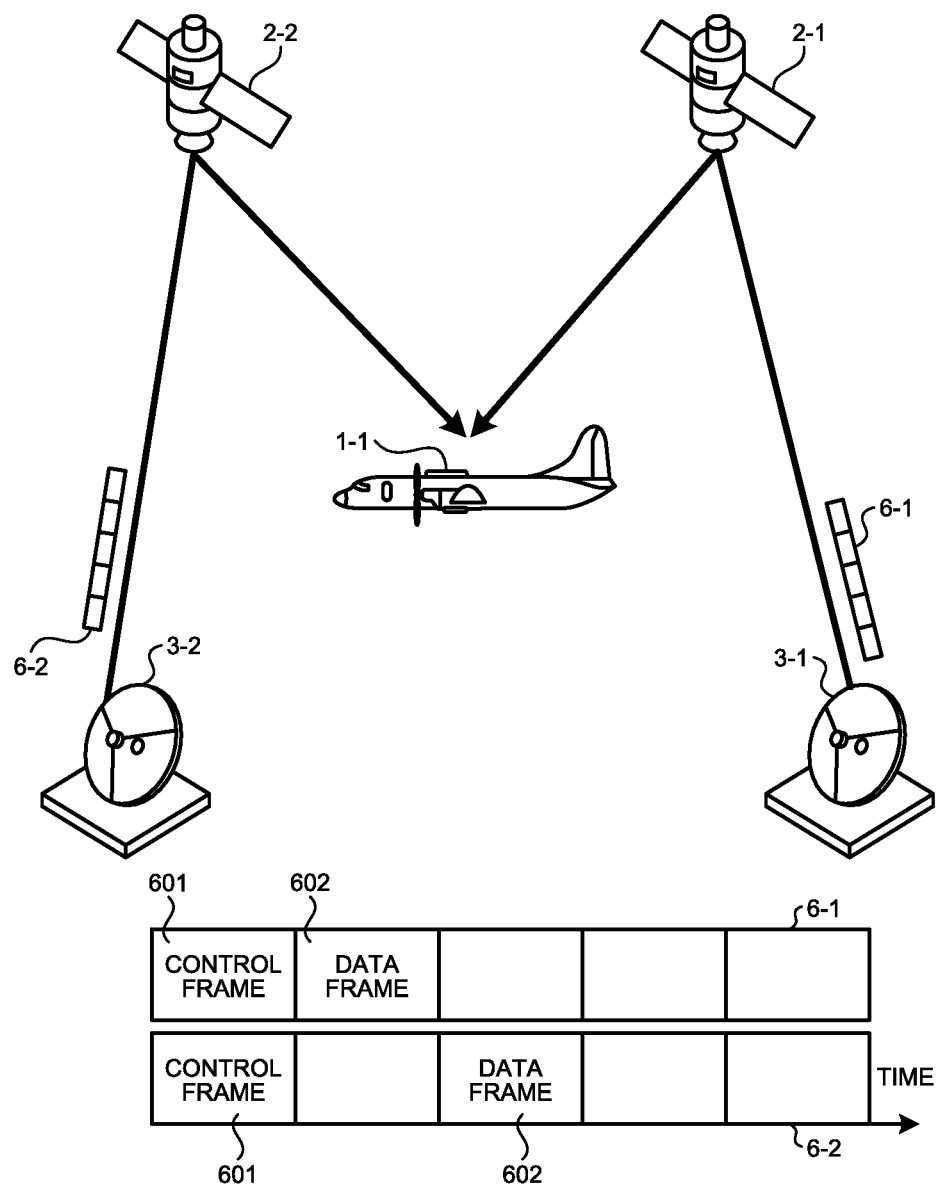
FIG. 3 illustrates reception of signals by the terminal via those two relay stations according to the embodiment.

FIG. 3 illustrates reception of signals by the terminal 1 via the two relay stations 2 according to the embodiment. When the relay stations 2-1 and 2-2 use the same timeslot and the same frequency to respectively transmit the signals 6-1 and 6-2 to the terminal 1, the terminal 1 can receive the signals 6-1 and 6-2 at the same time in the present embodiment by having two weight multipliers provided for the receiving antenna or causing an aperture of the receiving antenna divided into two. Compared with the signal 6-1, the signal 6-2 has its data frame in a different timeslot. When described without distinction, the signals 6-1 and 6-2 are each referred to as signal 6 in the present embodiment.

Figure 4:
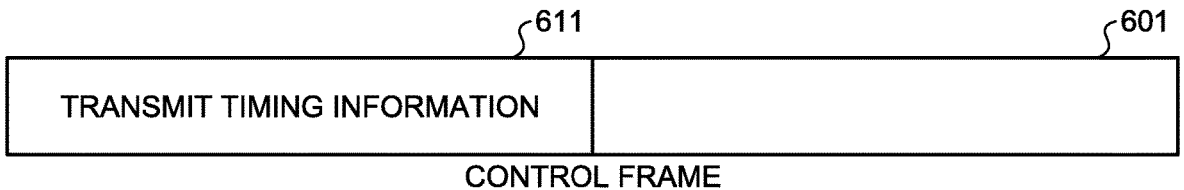
FIG. 4 illustrates an example of data structure of a control frame according to the embodiment.

FIG. 4 illustrates an example of data structure of the control frame 601 according to the embodiment. The control frame 601 includes transmit timing information 611 about the data frame directed to the terminal 1 from the base station 3.

Figure 5:
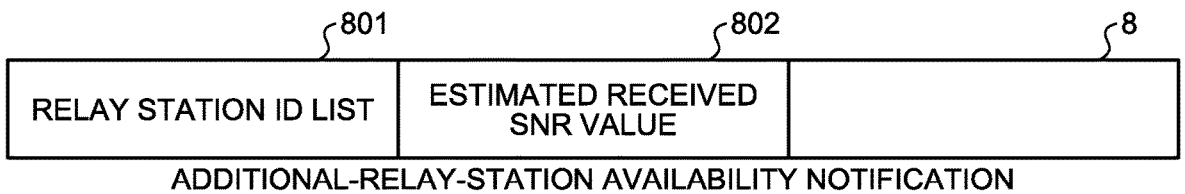
FIG. 5 illustrates an example of data structure of an additional-relay-station availability notification according to the embodiment.

FIG. 5 illustrates an example of data structure of an additional-relay-station availability notification 8 according to the embodiment. The additional-relay-station availability notification 8 includes a relay station identification (ID) list 801 indicating those relay stations 2 to which the terminal 1 can be connected, and estimated received signal-to-noise ratio (SNR) values 802 regarding the repay stations 2 the relay station IDs of which are described in the relay station ID list 801. The estimated received SNR value 802 can be obtained by the terminal 1 which receives the signal 6 transmitted from the relay station 2 and measures its power intensity. ID is also called identification information.

Figure 6:
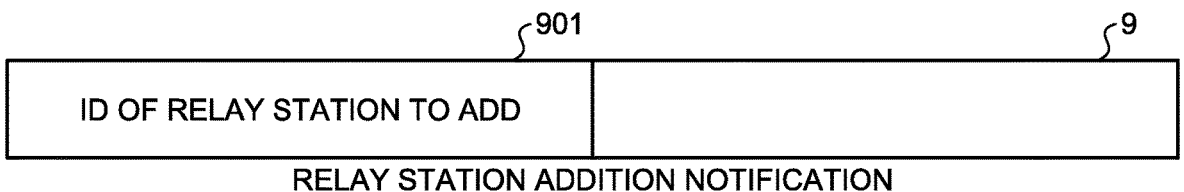
FIG. 6 illustrates an example of data structure of a relay station addition notification according to the embodiment.

FIG. 6 illustrates an example of data structure of a relay station addition notification 9 according to the embodiment. The relay station addition notification 9 includes an ID 901 of a new, additional relay station to which the terminal 1 is to be connected.

Figure 7:
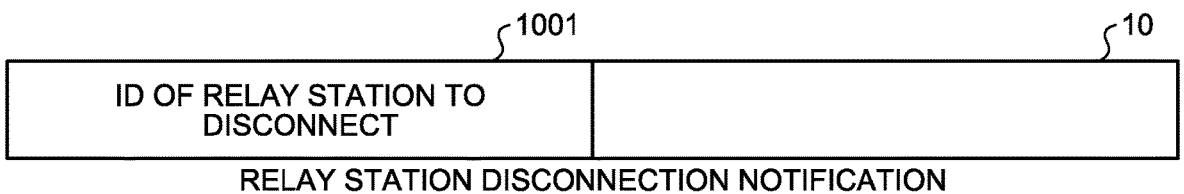
FIG. 7 illustrates an example of data structure of a relay station disconnection notification according to the embodiment.

FIG. 7 illustrates an example of data structure of a relay station disconnection notification 10 according to the embodiment. The relay station disconnection notification 10 includes an ID 1001 of a relay station from which the terminal 1 is to be disconnected.

Figure 8:
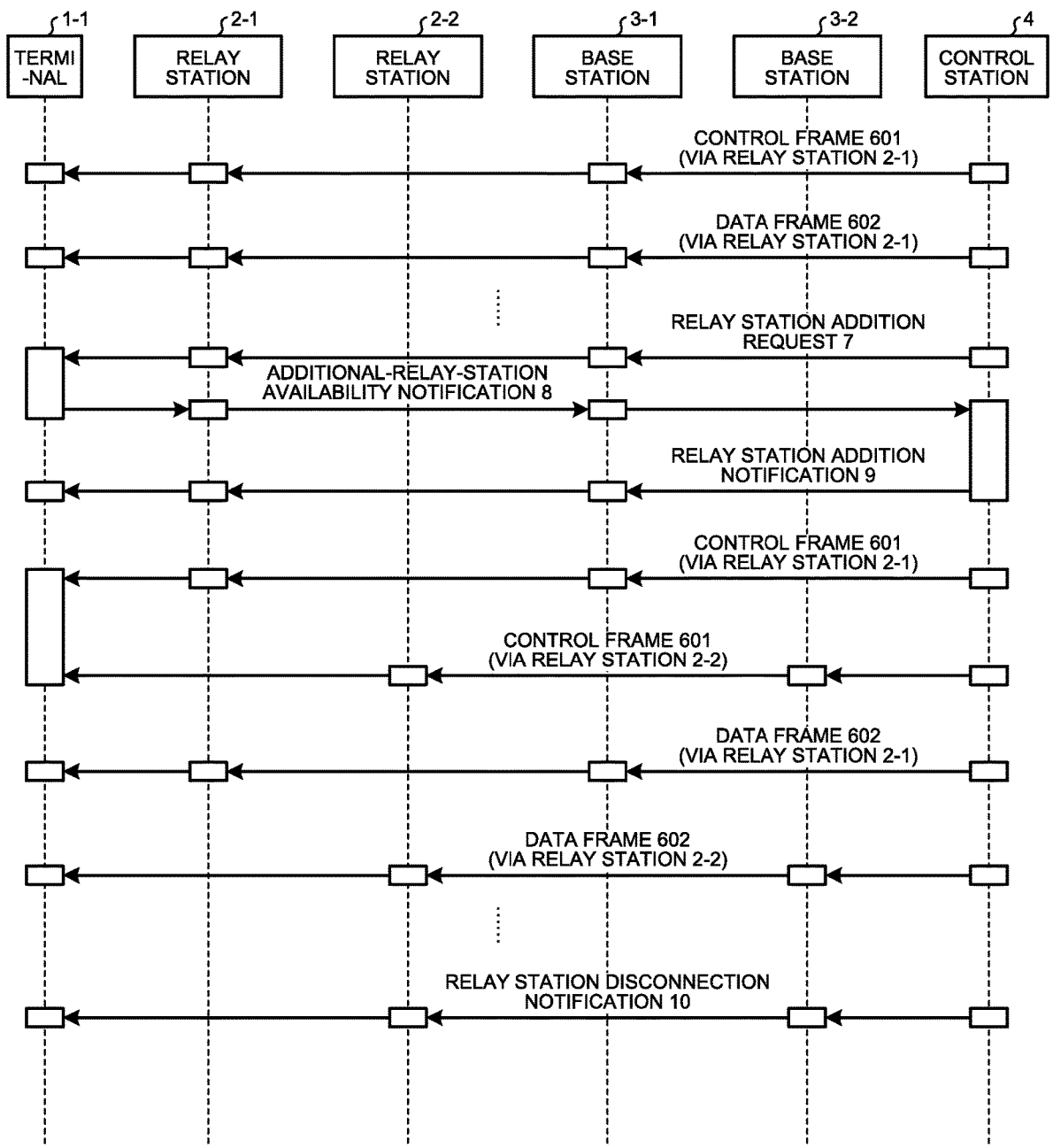
FIG. 8 is a sequence diagram illustrating operation of the terminal, operation of each of the relay stations, operation of each of those base stations, and operation of a control station according to the embodiment.

FIG. 8 is a sequence diagram illustrating operation of the terminal 1, operation of each of the relay stations 2, operation of each of the base stations 3, and operation of the control station 4 according to the embodiment. As FIG. 8 illustrates, the satellite communication system 500 uses the control frames 601, a relay station addition request 7, the additional-relay-station availability notification 8, the relay station addition notification 9, and the relay station disconnection notification 10 in communication. A description of details of each control is provided later. The relay station addition request 7 is a communication directed as a request to the terminal 1, and its data structure is not particularly limited.

Figure 9:
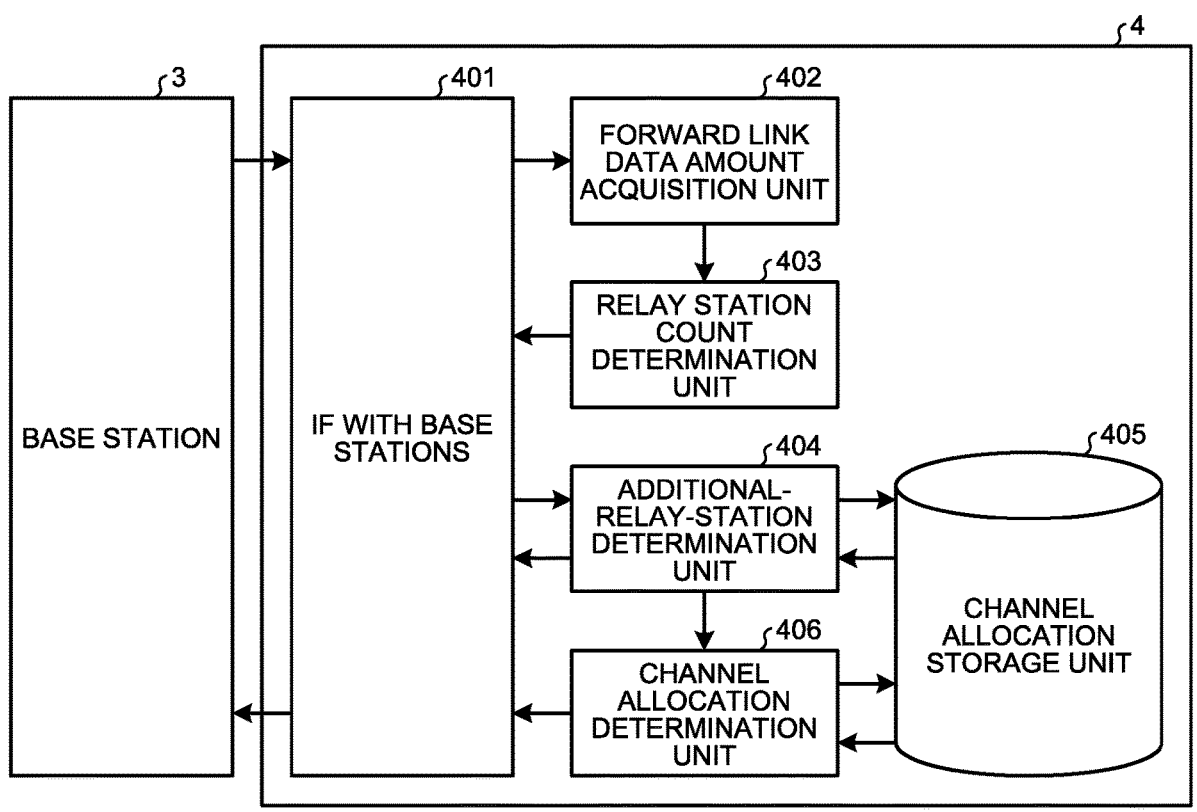
FIG. 9 is a functional block diagram of the control station according to the embodiment.

FIG. 9 is a functional block diagram of the control station 4 according to the embodiment. The control station 4 includes an interface (IF) 401 with the base stations, a forward link data amount acquisition unit 402, a relay station count determination unit 403, an additional-relay-station determination unit 404, a channel allocation storage unit 405, and a channel allocation determination unit 406.

Figure 10:
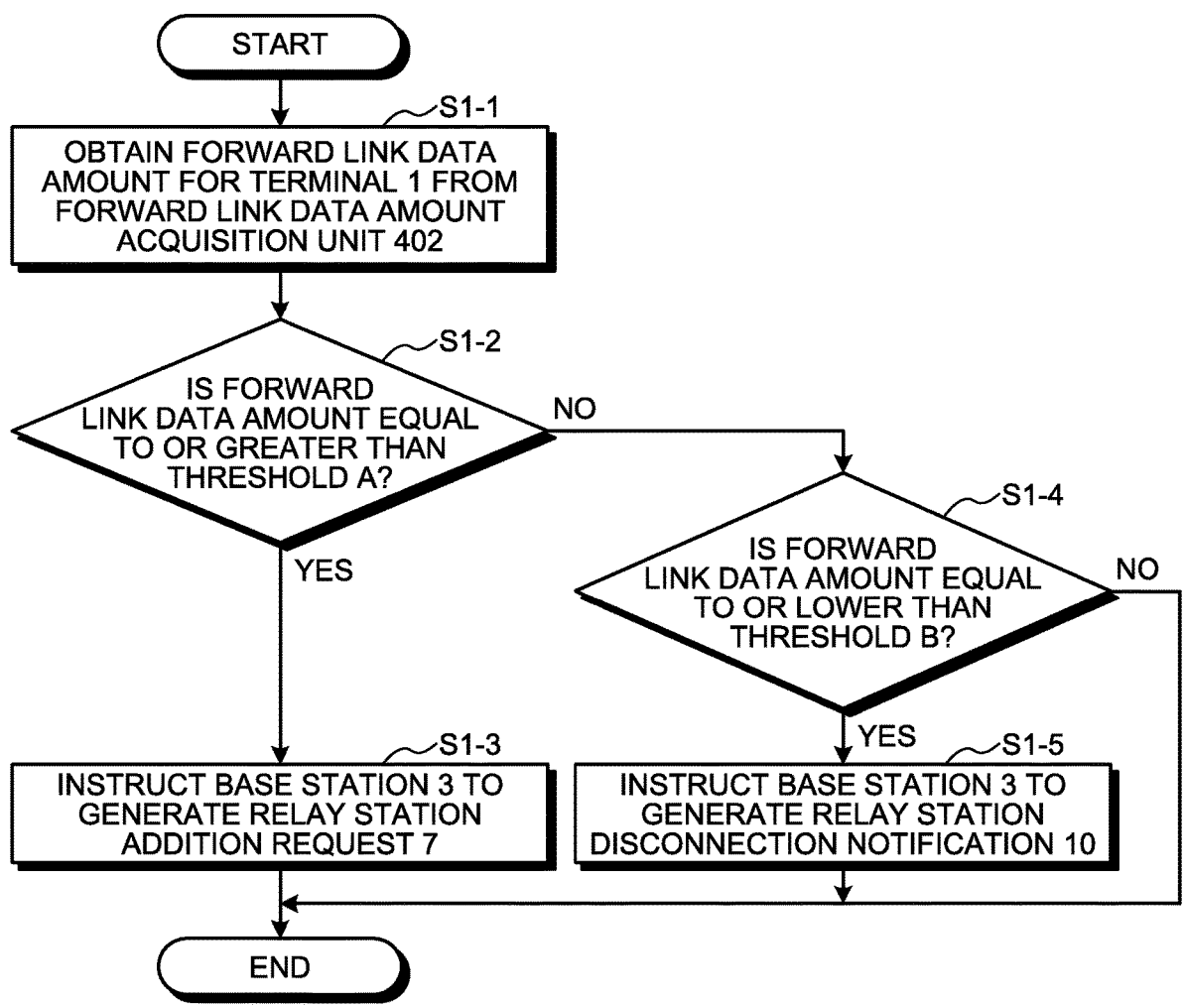
FIG. 10 is a flowchart illustrating an operational example of a relay station count determination unit according to the embodiment.

A description is provided of operation of the relay station count determination unit 403. FIG. 10 is a flowchart illustrating an operational example of the relay station count determination unit 403 according to the embodiment. As FIG. 10 illustrates, the relay station count determination unit 403 first obtains, from the forward link data amount acquisition unit 402, a forward link data amount for the terminal 1 (step S1-1).

Next, the relay station count determination unit 403 determines whether or not the forward link data amount obtained for the terminal 1 at step S1-1 is equal to or greater than a threshold A (step S1-2). If the forward link data amount for the terminal 1 is equal to or greater than the threshold A (Yes to step S1-2), the relay station count determination unit 403 determines that an inadequate number of the relay stations 2 are connected to the terminal 1 compared to the forward link data amount for the terminal 1 and instructs the base station 3 to generate the relay station addition request 7 (step S1-3). If, on the other hand, the forward link data amount for the terminal 1 is lower than the threshold A (No to step S1-2), the relay station count determination unit 403 compares the forward link data amount for the terminal 1 with a threshold B (step S1-4). The threshold A is a value greater than the threshold B.

If the forward link data amount for the terminal 1 is equal to or lower than the threshold B (Yes to step S1-4), the relay station count determination unit 403 determines that a large number of the relay stations 2 are connected to the terminal 1 compared to the forward link data amount for the terminal 1 and instructs the base station 3 to generate the relay station disconnection notification 10 (step S1-5). If the forward link data amount for the terminal 1 is greater than the threshold B (No to step S1-4), the process ends. A method for determining the thresholds A and B is not limited. For example, the thresholds A and B may be determined according to a storage amount that is obtained from a transmission buffer 308 of the base station 3 or may be systematically predetermined fixed values. In the above process, the relay station count determination unit 403 can determine how many relay stations are to be connected according to the forward link data amount for the terminal 1.

A description is provided of operation of the additional-relay-station determination unit 404. The additional-relay-station determination unit 404 determines the additional relay station 2 to be connected to the terminal 1 on a basis of the ID list 801 of the relay stations connectable to the terminal 1 that is described in the additional-relay-station availability notification 8 received from the terminal 1 via the base station 3, and a forward-link traffic load condition of the base station 3 that is obtained from the channel allocation storage unit 405. In the following description, the additional-relay-station determination unit 404 is assumed to operate for determining, among those N relay stations 2 that are present in the entire communication system, the new relay station 2 to be connected to the terminal 1.

Figure 11:
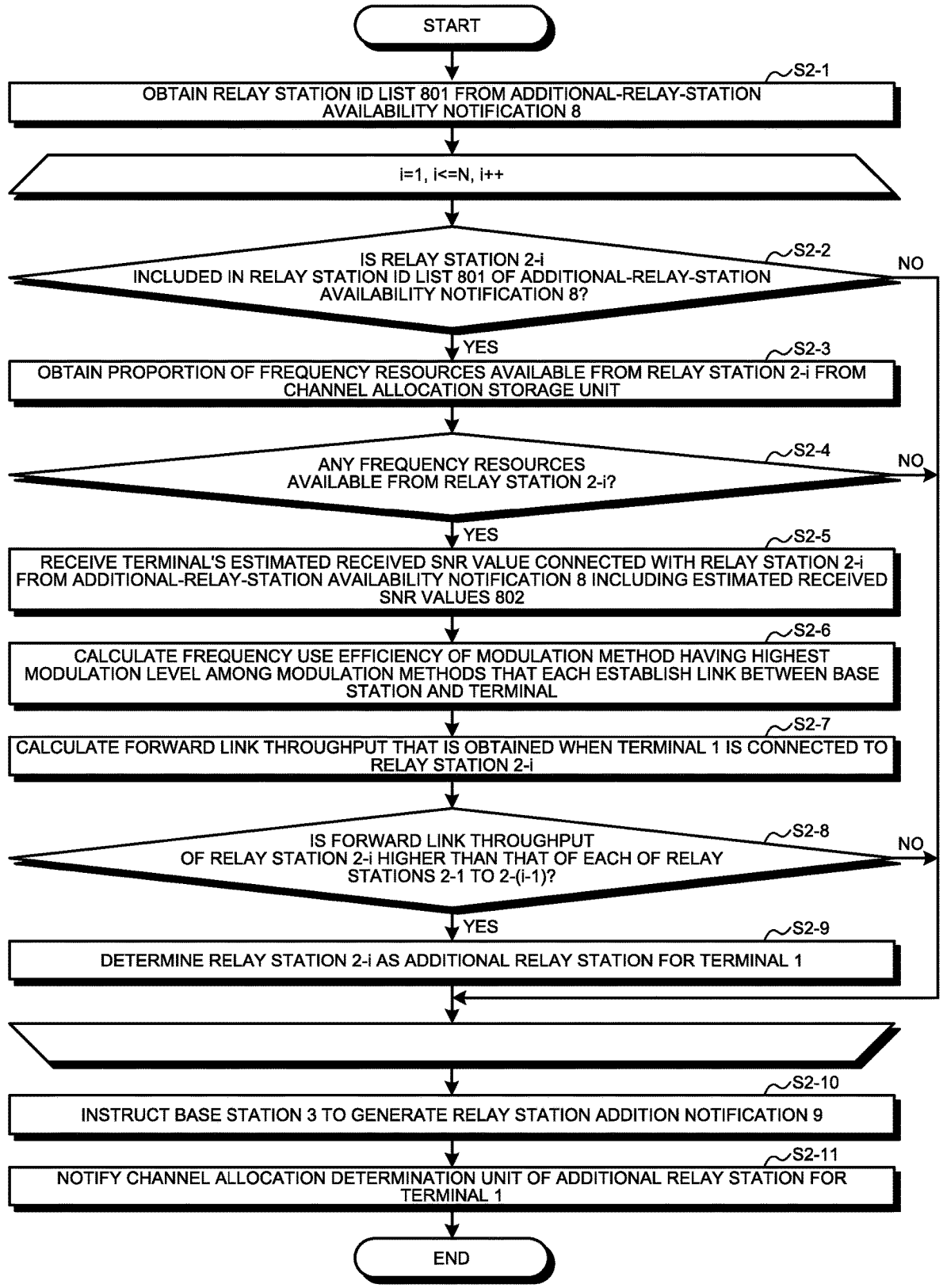
FIG. 11 is a flowchart illustrating an operational example of an additional-relay-station determination unit according to the embodiment.

FIG. 11 is a flowchart illustrating the operational example of the additional-relay-station determination unit 404 according to the embodiment. As FIG. 11 illustrates, the additional-relay-station determination unit 404 obtains the relay station ID list 801 described in the additional-relay-station availability notification 8 (step S2-1). The additional-relay-station determination unit 404 checks whether or not the relay station 2-$i$ is included in the relay station ID list 801 (step S2-2). An initial value of i is 1, and i is incremented by one until i reaches N. i is incremented by one after step S2-9 (described later) ends, after the procedure proceeds to branch No of step S2-2, after the procedure proceeds to branch No of step S2-4, and after the procedure proceeds to branch No of step S2-8. The process from step S2-2 to step S2-9 is repeated until i becomes N. If the relay station 2-$i$ is included in the relay station ID list 801 (Yes to step S2-2), the additional-relay-station determination unit 404 obtains, from the channel allocation storage unit 405, a proportion of frequency resources allocated to the relay station 2-$i$ that can be allocated to the terminal 1 (step S2-3). After step S2-3, the additional-relay-station determination unit 404 determines whether or not there are any frequency resources that can be allocated to the terminal 1 among the frequency resources that are allocated to the relay station 2-$i$ and are obtained at step S2-3 (step S2-4). If the relay station 2-$i$ is not included in the relay station ID list 801 (No to step S2-2), the process proceeds to the flow that follows step S2-9.

If there are any frequency resources available from the relay station 2-$i$ as a result of the determination at step S2-4 (Yes to step S2-4), the additional-relay-station determination unit 404 obtains the estimated received SNR value connected with the relay station 2-$i$ by means of the additional-relay-station availability notification 8 which includes the terminal 1's estimated received SNR value 802 connected with the relay station 2-$i$ (step S2-5). If there are no frequency resources available from the relay station 2-$i$ (No to step S2-4), the process proceeds to the flow that follows step S2-9. After step S2-5, the additional-relay-station determination unit 404 obtains frequency use efficiency of a modulation method which has a highest modulation level among modulation methods that each enable establishment of a link between the base station 3 and the terminal 1 (step S2-6). It is to be noted here that if the forward-link modulation method is predetermined for the terminal 1, frequency use efficiency of this predetermined modulation method may be obtained. Here the frequency use efficiency refers to information bits per unit bandwidth.

Next, using the proportion of the frequency resources allocated to the relay station 2-$i$ that is obtained at step S2-3 as the proportion that can be allocated to the terminal 1 and the frequency use efficiency obtained at step S2-6 for the terminal 1, the additional-relay-station determination unit 404 calculates a forward link throughput that is obtained when the terminal 1 is connected to the relay station 2-$i$ (step S2-7). If the forward link throughput of the relay station 2-$i$ is higher than a throughput that is obtained when the terminal 1 is connected to each of the relay stations 2-1 to 2-($i$−1) (Yes to step S2-8), the additional-relay-station determination unit 404 determines the relay station 2-$i$ as the additional relay station for the terminal 1 (step S2-9). If the forward link throughput of the relay station 2-$i$ is equal to or lower than the throughput that is obtained when the terminal 1 is connected to each of the relay stations 2-1 to 2-($i$−1) (No to step S2-8), the process proceeds to the flow that follows step S2-9. The additional-relay-station determination unit 404 instructs the base station 3 to generate the relay station addition notification 9 (step S2-10). The additional-relay-station determination unit 404 notifies the channel allocation determination unit 406 of the additional relay station for the terminal 1 (step S2-11). As described above, the N relay stations 2 of the system each undergo the process from step S2-2 to step S2-9, so that the relay station 2 that delivers the highest throughput among the relay stations 2 connectable to the terminal 1 can be determined and reported at steps S2-10 and S2-11 as the additional relay station.

Figure 12:
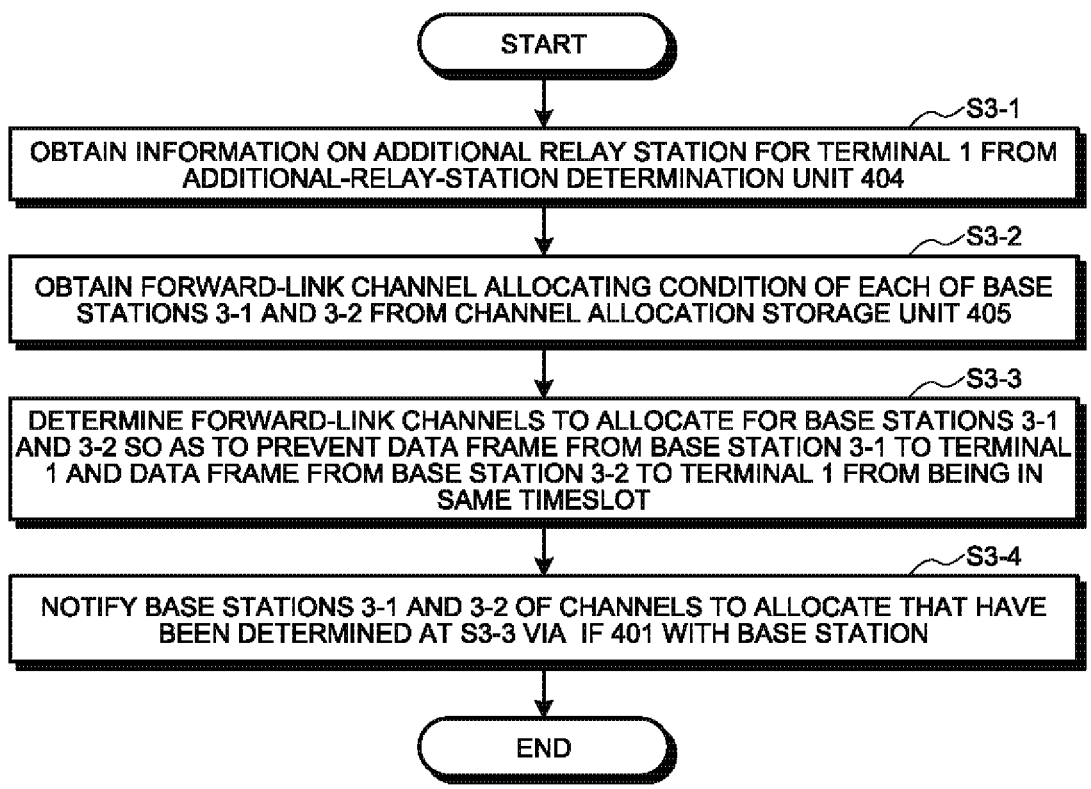
FIG. 12 is a flowchart illustrating an operational example of a channel allocation determination unit according to the embodiment.

A description is provided next of operation of the channel allocation determination unit 406, assuming that the terminal 1 receives the data frame 602 from both the relay stations 2-1 and 2-2. FIG. 12 is a flowchart illustrating the operational example of the channel allocation determination unit 406 according to the embodiment. The channel allocation determination unit 406 obtains, from the additional-relay-station determination unit 404, information on the relay station 2 which the terminal 1 adds (step S3-1). The channel allocation determination unit 406 obtains a forward-link channel allocating condition of each of the base stations 3-1 and 3-2 from the channel allocation storage unit 405 (step S3-2). The channel allocation determination unit 406 determines forward-link channels to allocate for the base stations 3-1 and 3-2 (step S3-3).

Figure 13:
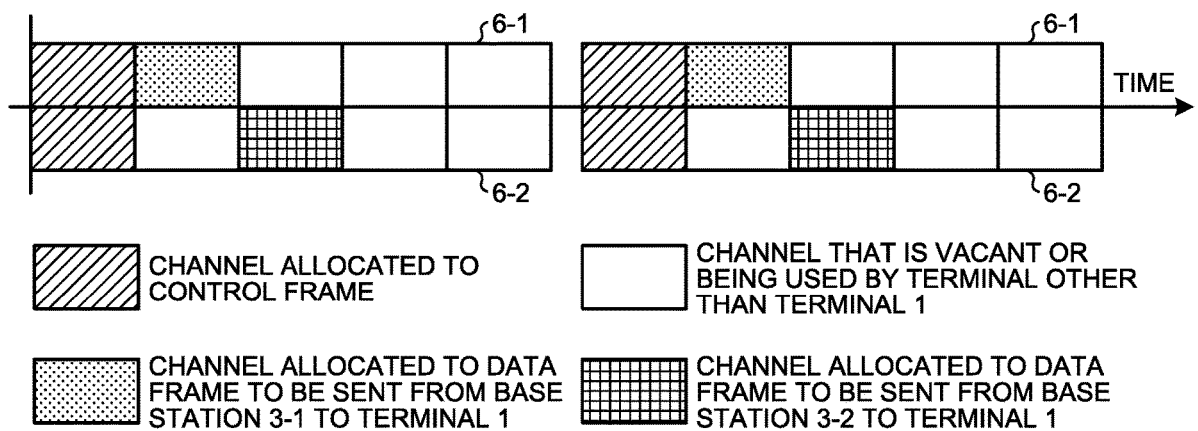
FIG. 13 illustrates forward-link channel allocation according to the embodiment.

FIG. 13 illustrates forward-link channel allocation according to the embodiment. As FIG. 13 illustrates, the channel allocation determination unit 406 prevents the data frame 602 of the base station 3-1 and the data frame 602 of the base station 3-2 from being in the same timeslot when determining the channels to allocate at step S3-3. When the channels to allocate are determined, with a propagation delay that is caused by a difference between a distance from the base station 3-1 to the relay station 2-1 and a distance from the base station 3-2 to the relay station 2-2 being taken into account, a timeslot for the data frame 602 of the signal 6-1 and a timeslot for the data frame 602 of the signal 6-2 are determined so as to prevent these data frames 602 from being received at the same time by the terminal 1. After determining at step S3-3, the channel allocation determination unit 406 notifies the base stations 3-1 and 3-2 of the channels to allocate (step S3-4). Because of the above series of steps of the channel allocation determination unit 406, the control station 4 can determine the forward-link channels to allocate for the base stations 3-1 and 3-2 in order that the terminal 1 can receive the forward-link data frames from both the relay stations 2-1 and 2-2.

The IF 401 with the base stations, the forward link data amount acquisition unit 402, the relay station count determination unit 403, the additional-relay-station determination unit 404, the channel allocation storage unit 405, and the channel allocation determination unit 406 are implemented by processing circuitry which is electronic circuitry.

The present processing circuitry may be dedicated hardware or control circuitry including a memory and a central processing unit (CPU) that executes programs stored in the memory. The memory mentioned here corresponds to, for example, a magnetic disk, an optical disk, or a nonvolatile or volatile semiconductor memory such as a random-access memory (RAM), a read-only memory (ROM), or a flash memory. If the present processing circuitry is the control circuitry including the CPU, control circuitry illustrated in FIG. 14 according to the embodiment, for example, is that control circuitry.

Figure 14:
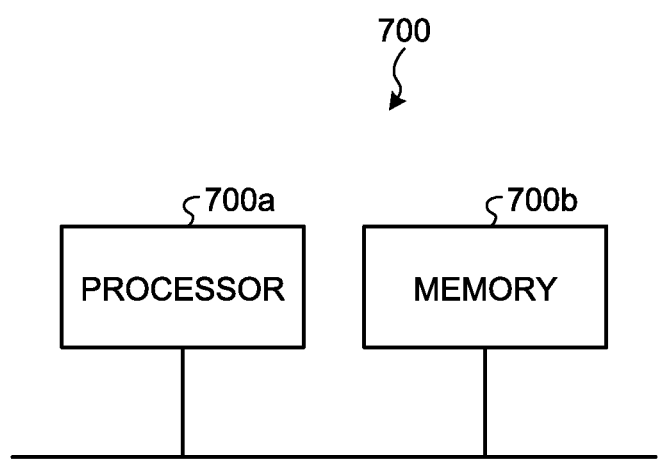
FIG. 14 illustrates control circuitry according to the embodiment.

As illustrated in FIG. 14, the control circuitry 700 includes a processor 700a that is a CPU, and a memory 700b. When the FIG. 14 control circuitry 700 is used for the above implementation, the processor 700a reads and executes a program that corresponds to each process and is stored in the memory 700b. The memory 700b is also used as a temporary memory for each process that is performed by the processor 700a.

The forward link data amount acquisition unit 402 obtains the forward link data amount for the terminal 1 from the base station 3. The relay station count determination unit 403 determines how many relay stations are to be connected to the terminal 1 according to the forward link data amount for the terminal 1 that has been obtained by the forward link data amount acquisition unit 402.

Figure 15:
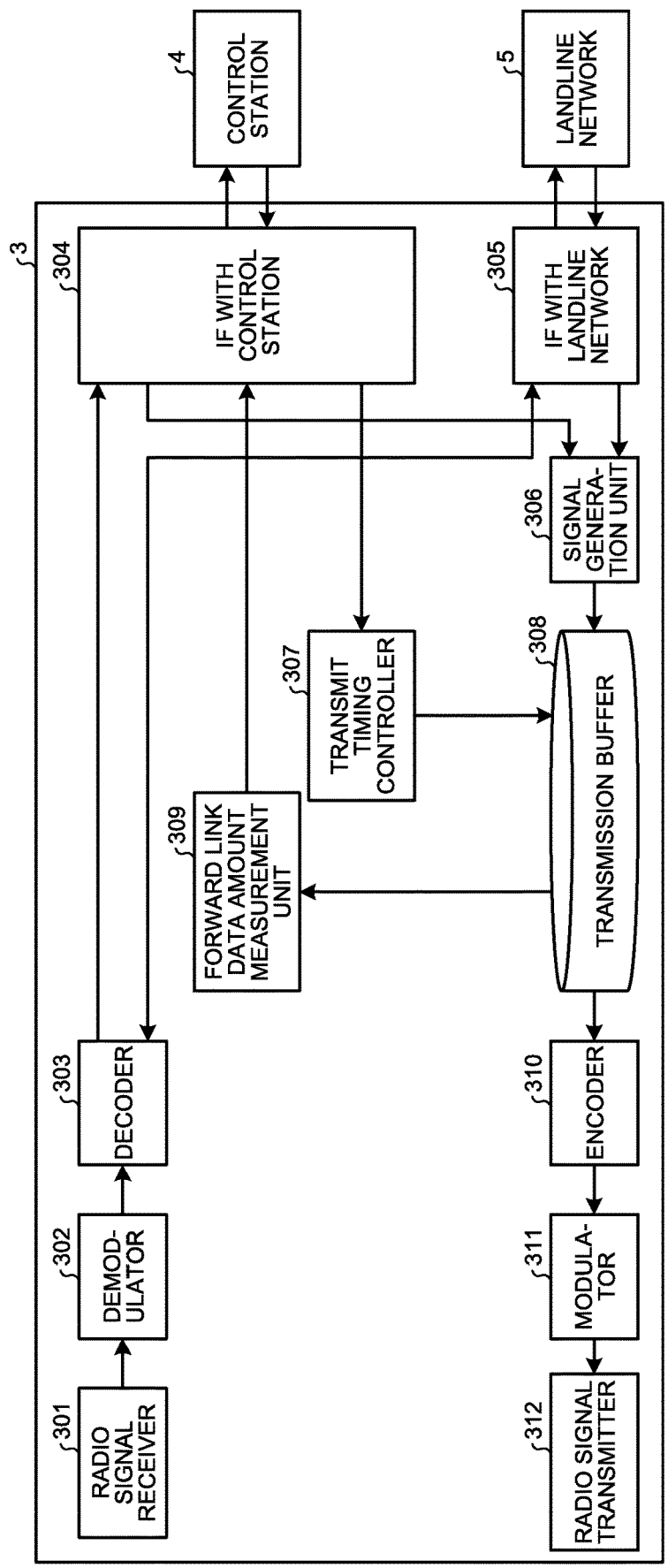
FIG. 15 is a functional block diagram of the base station according to the embodiment.

A description is provided of the operation of the base station 3. FIG. 15 is a functional block diagram of the base station 3 according to the embodiment. The base station 3 includes a radio signal receiver 301, a demodulator 302, a decoder 303, an IF 304 with the control station, an IF 305 with the landline network, a signal generation unit 306, a transmit timing controller 307, a transmission buffer 308, a forward link data amount measurement unit 309, an encoder 310, a modulator 311, and a radio signal transmitter 312. Each of the functional units of the base station 3 is implemented by control circuitry 700.

The radio signal receiver 301 includes an antenna with a variable directivity, a low-noise amplifier (LNA), and a downconverter. The radio signal receiver 301 receives transmission data transmitted by the terminal 1 to the base station 3 via the relay station 2 and then converts the radio frequency (RF) band transmission data to a baseband electrical signal. The demodulator 302 demodulates the electrical signal output from the radio signal receiver 301. The decoder 303 decodes the signal demodulated by the demodulator 302. If the decoded receive data is the additional-relay-station availability notification 8 or a control frame 601, the decoder 303 outputs the decoded receive data to the IF 304 with the control station. If, on the other hand, the decoded receive data is a data frame 602 received from the terminal 1, the decoder 303 outputs the decoded receive data to the IF 305 with the landline network. The signal generation unit 306 generates the data frame 602, the control frame 601, the relay station addition request 7, and the relay station addition notification 9 and stores these in the transmission buffer 308.

Timing of output of the data frame 602 from the transmission buffer 308 to the encoder 310 is controlled by the transmit timing controller 307. The transmit timing controller 307 controls the timing of the output of the data frame 602 according to a data frame 602 output timing determined by the channel allocation determination unit 406 of the control station 4. The encoder 310 encodes the data frame 602, the control frame 601, the relay station addition request 7, and the relay station addition notification 9 that are output from the transmission buffer 308. Examples of a code that the encoder 310 can use for encoding include, but not limited in the present embodiment to, a convolutional code, a low-density parity-check (LDPC) code, and a Reed-Solomon (RS) code. The modulator 311 modulates the encoded data. Examples of a modulation method that can be used by the modulator 311 include, but not limited in the present embodiment to, quadrature phase-shift keying (QPSK) and quadrature amplitude modulation (QAM), among others. The radio signal transmitter 312 includes an antenna with a variable directivity, an LNA, and an upconverter, among others. The radio signal transmitter 312 converts the baseband electrical signal output from the modulator 311 to RF band transmission data and emits this transmission data into space via the transmitting antenna. The forward link data amount measurement unit 309 continuously monitors the transmission buffer 308 and regularly notifies the control station 4's forward link data amount acquisition unit 402 of a data frame 602 amount that the base station 3 has for all the terminals 1.

Figure 16:
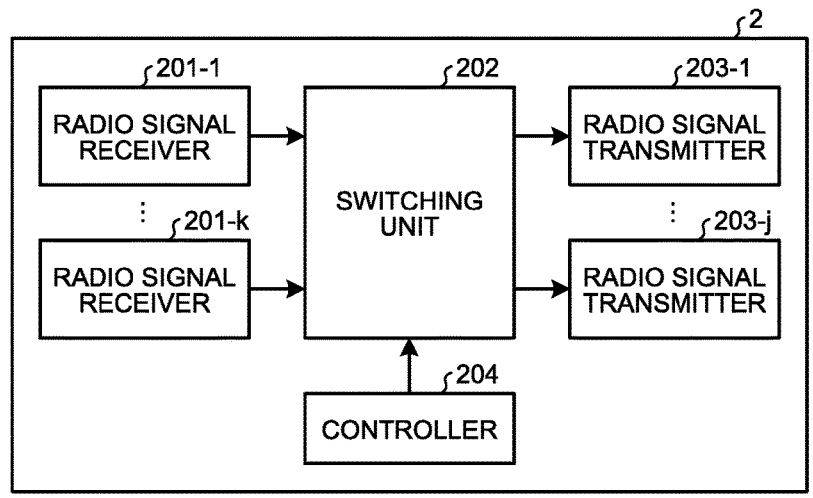
FIG. 16 is a functional block diagram of the relay station according to the embodiment.

A description is provided of the operation of the relay station 2. FIG. 16 is a functional block diagram of the relay station 2 according to the embodiment. The relay station 2 includes radio signal receivers 201-1 to 201-$k$, a switching unit 202, radio signal transmitters 203-1 to 203-$j$, and a controller 204. Although FIG. 16 illustrates the k radio signal receivers 201-1 to 201-$k$, it is to be noted that k denotes a receive beam count. When hereinafter described without distinction, the radio signal receivers 201-1 to 201-$k$ are each referred to as radio signal receiver 201. While the illustration includes the j radio signal transmitters 203-1 to 203-$j$, it should similarly be noted that j denotes a transmit beam count. When hereinafter described without distinction, the radio signal transmitters 203-1 to 203-$j$ are each referred to as radio signal transmitter 203. The configuration example illustrated in FIG. 16 refers to a multi-beam satellite including the switching unit 202; however, this is not limiting. For example, the relay station may include regenerative repeating functionality to re-modulate, for transmission, a received signal after demodulation, or may be a bent pipe relay station that includes a fixed connection relation between the radio signal receiver 201 and the radio signal transmitter 203, thus having no switching unit 202. Each of the functional units of the relay station 2 is implemented by control circuitry 700.

The radio signal receiver 201 includes an antenna with a variable directivity, an LNA, and a downconverter. The radio signal receiver 201 receives receive data from the terminal 1 or the base station 3 and then converts the RF band receive data to an electrical signal with a frequency band that the switching unit 202 can process. The switching unit 202 outputs the electrical signal output from the radio signal receiver 201 to one of the radio signal transmitters 203 that is specified by the controller 204. Here the switching unit 202 may have the regenerative repeating functionality. In that case, no notification of information on a destination is given from the controller 204, but instead, control information included in a portion of data to relay may be reproduced for equivalent functional implementation. The radio signal transmitter 203 includes an antenna with a variable directivity, an LNA, and an upconverter, among others. The radio signal transmitter 203 converts the output from the switching unit 202 to RF band output and emits this output into space via the antenna.

Figure 17:
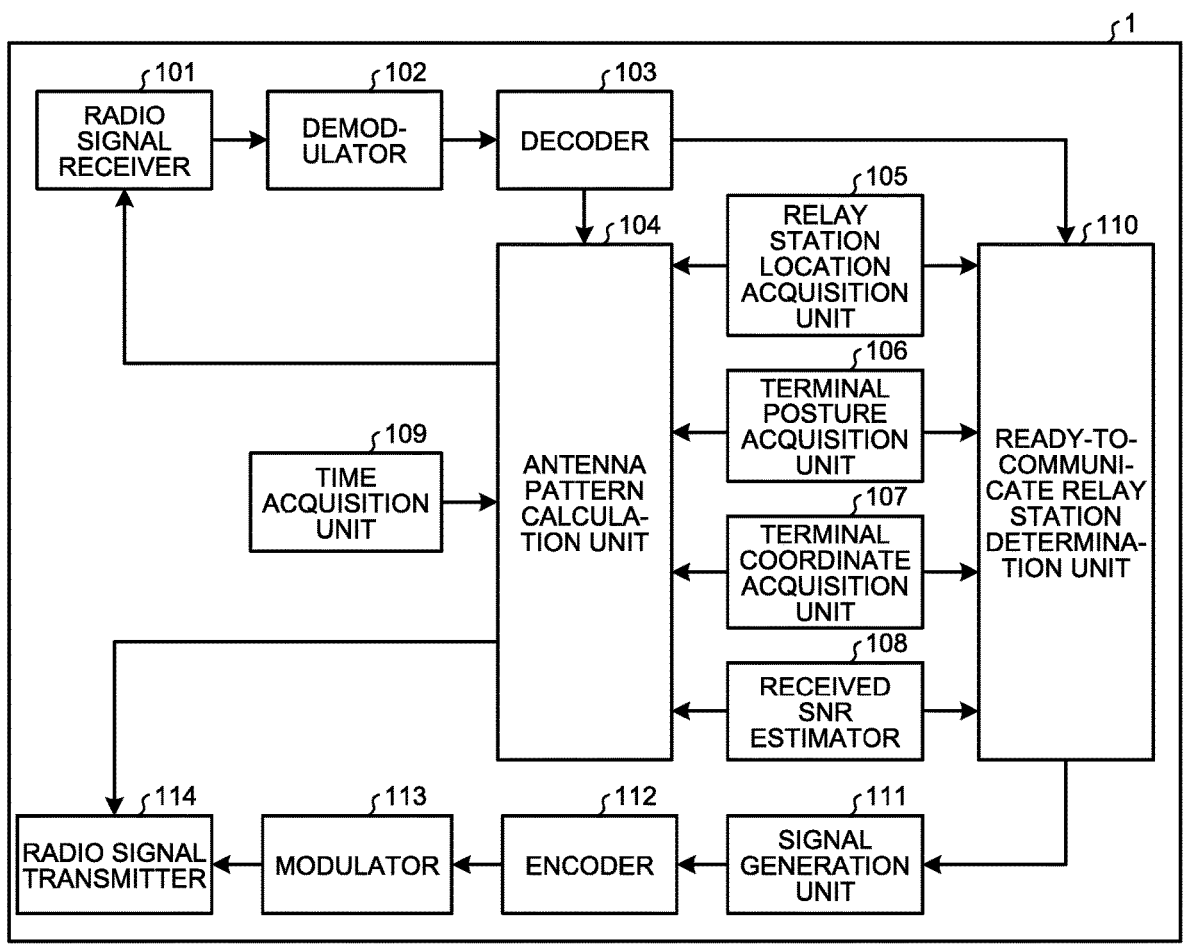
FIG. 17 is a functional block diagram of the terminal according to the embodiment.

A description is provided of the operation of the terminal 1. FIG. 17 is a functional block diagram of the terminal 1 according to the embodiment. The terminal 1 includes a radio signal receiver 101, demodulators 102, decoders 103, an antenna pattern calculation unit 104, a relay station location acquisition unit 105, a terminal posture acquisition unit 106, a terminal coordinate acquisition unit 107, a received SNR estimator 108, a time acquisition unit 109, a ready-to-communicate relay station determination unit 110, a signal generation unit 111, an encoder 112, a modulator 113, and a radio signal transmitter 114. Each of the functional units of the terminal 1 is implemented by control circuitry 700.

The radio signal receiver 101 includes an antenna with a variable directivity, LNAs, and downconverters. The radio signal receiver 101 receives a signal transmitted by the base station 3 to the terminal 1 via the relay station 2 and then converts the RF band signal to a baseband electrical signal. The demodulator 102 demodulates the electrical signal output from the radio signal receiver 101.

Figure 18:
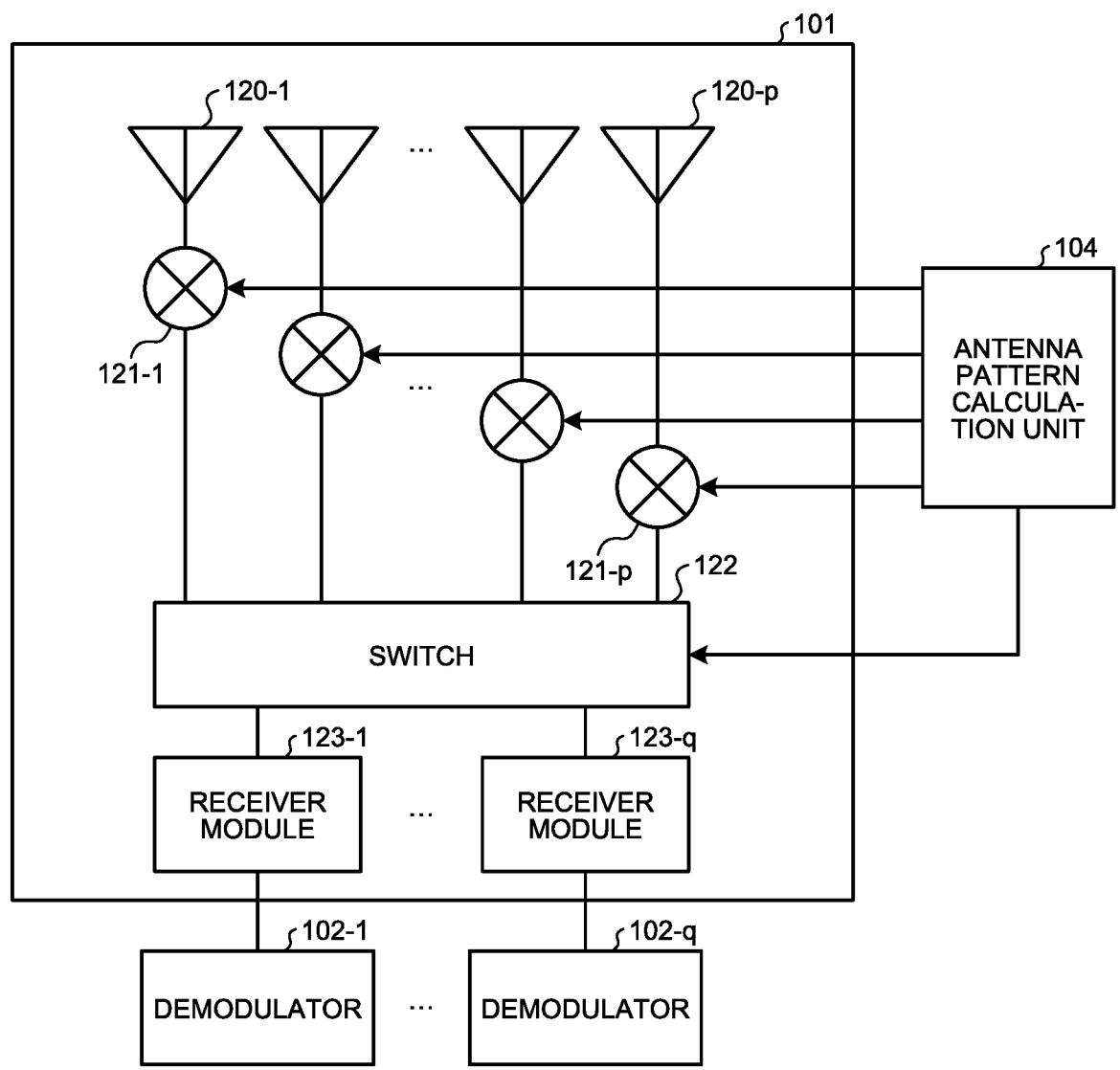
FIG. 18 is a functional block diagram of a radio signal receiver according to the embodiment.

FIG. 18 is a functional block diagram of the radio signal receiver 101 according to the embodiment. The radio signal receiver 101 includes antennas 120-1 to 120-$p$, phase shifters 121-1 to 121-$p$, a switch 122, and receiver modules 123-1 to 123-$q$. When described without distinction, the antennas 120-1 to 120-$p$ are each referred to as antenna 120. When described without distinction, the phase shifters 121-1 to 121-$p$ are each referred to as phase shifter 121. When described without distinction, the receiver modules 123-1 to 123-$q$ are each referred to as receiver module 123.

The antennas 120-1 to 120-$p$ compose an array antenna. The antennas 120-1 to 120-$p$ are connected to the phase shifters 121-1 to 121-$p$, respectively. The phase shifters 121-1 to 121-$p$ change respective antenna patterns of the antennas 120-1 to 120-$p$. The switch 122 combines received signals from the antennas 120 in any combination. The switch 122 is connected to the antennas 120-1 to 120-$p$. Each of the receiver modules 123-1 to 123-$q$ is configured to include the LNA and the downconverter. The receiver modules 123-1 and 123-$q$ each convert a received RF band signal to a received signal with a frequency band that the demodulator 102 can demodulate. It is to be noted here that a maximum number into which the aperture by the antennas 120 are divided is represented by n and corresponds to a maximum number of relay stations from which signals can be received simultaneously by the radio signal receiver 101. The antenna pattern calculation unit 104 outputs a signal to control the phase shifter 121 and by controlling the phase shifter 121, can control the antenna pattern of the antenna 120. The antenna pattern calculation unit 104 also controls the switch 122 by outputting a signal and thus enables received signals from the antennas 120 to be combined in any combination. When, for example, the entire aperture is desirably used by the terminal 1 to be oriented toward one relay station, received signals from the antennas 120-1 and 120-$p$ are combined. When, on the other hand, the aperture is desirably divided to be oriented toward the relay stations 2-1 and 2-2 simultaneously, it can be realized by setting up a path along which received signals from the antennas 120-1 to 120-$p/2$ are combined and then input to the receiver module 123-1, and a path along which received signals from the antennas 120-$(m/2+1)$ to 120-$p$ are combined and then input to the receiver module 123-2.

The decoder 103 decodes the signal demodulated by the demodulator 102. Upon decoding the control frame 601, the decoder 103 notifies the antenna pattern calculation unit 104 of the information described in the control frame 601. It is to be noted that as many demodulators 102 and decoders 103 as there are signals to receive simultaneously are required. In FIG. 17, however, for convenienc sake, the demodulators 102 are shown by the demodulator 102, and the decoders 103 are shown by the decoder 103. Using relay station coordinates that are obtained by the relay station location acquisition unit 105, posture information about the terminal 1 that is obtained by the terminal posture acquisition unit 106, terminal coordinates that are obtained by the terminal coordinate acquisition unit 107, those received SNRs that are obtained by the received SNR estimator 108 regarding signals received by the terminal 1 from the relay stations 2, and the items of data frame transmit timing information 611 that are described in the control frames 601 received by the terminal 1 from the base stations 3, the antenna pattern calculation unit 104 calculates the control signal for each phase shifter 121. It is to be noted here that the received SNR estimator 108 of the terminal 1 may estimate the received SNR from the relay station 2, for example, by measuring a received SNR of a pilot signal transmitted from the relay station 2 to the terminal 1 or roughly estimating from a distance between the terminal 1 and the relay station 2 that is calculated using the relay station coordinates obtained by the relay station location acquisition unit 105 and the terminal coordinates obtained by the terminal coordinate acquisition unit 107. These methods are not limiting.

Figure 19:
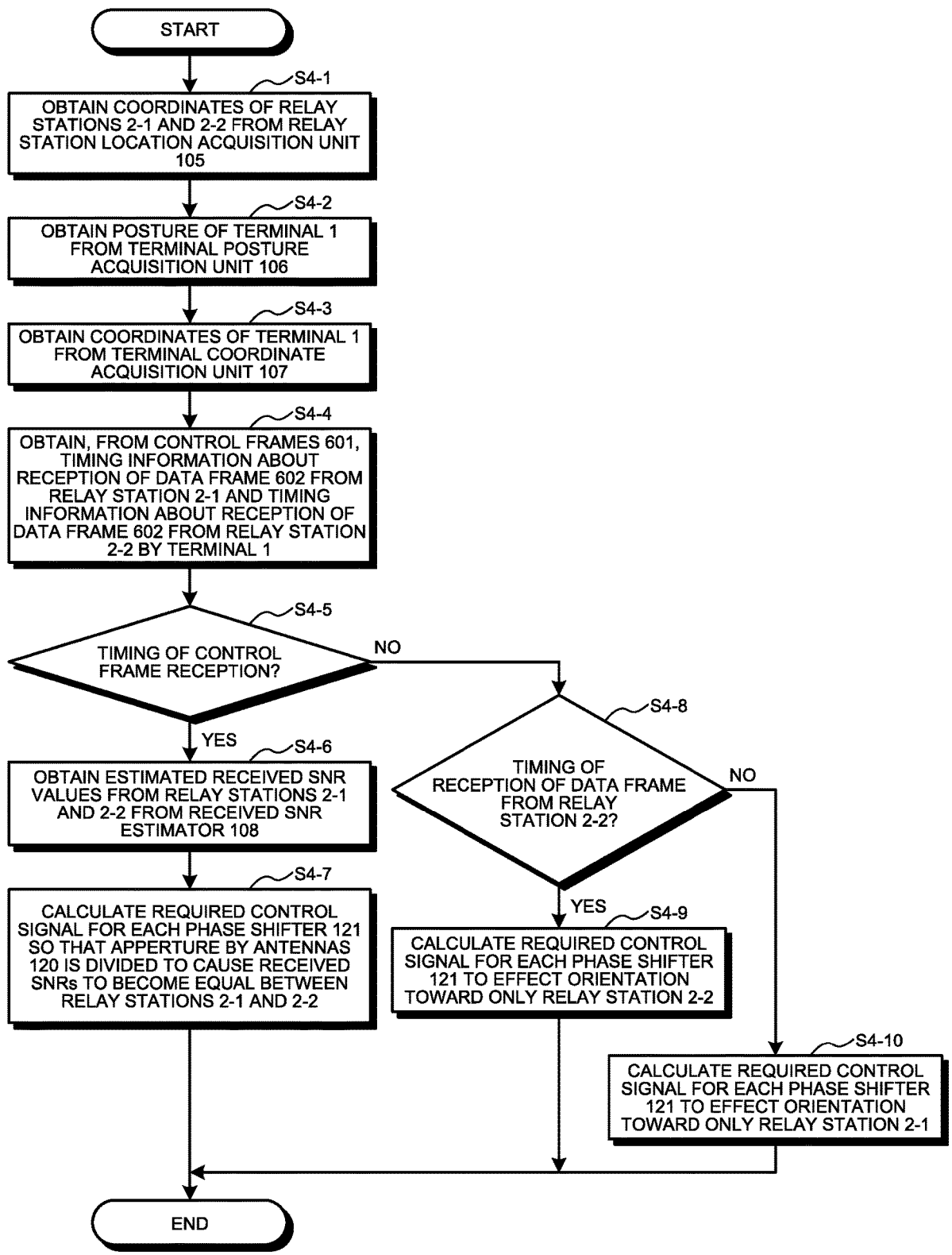
FIG. 19 is a flowchart illustrating an operational example of an antenna pattern calculation unit according to the embodiment.

A description is provided next of operation of the antenna pattern calculation unit 104, assuming that the terminal 1 receives the data frame 602 from both the relay stations 2-1 and 2-2. FIG. 19 is a flowchart illustrating the operational example of the antenna pattern calculation unit 104 according to the embodiment. The antenna pattern calculation unit 104 obtains the coordinates of the relay station 2-1 and the coordinates of the relay station 2-2 from the relay station location acquisition unit 105 (step S4-1). The antenna pattern calculation unit 104 obtains the posture information about the terminal 1 from the terminal posture acquisition unit 106 (step S4-2). The antenna pattern calculation unit 104 obtains the coordinates of the terminal 1 from the terminal coordinate acquisition unit 107 (step S4-3). The antenna pattern calculation unit 104 obtains the transmit timing information 611 about the data frame 602 of the relay station 2-1 by means of the control frame 601 received from the relay station 2-1. The antenna pattern calculation unit 104 also obtains the transmit timing information 611 about the data frame 602 of the relay station 2-2 by means of the control frame 601 received from the relay station 2-(step S4-4).

The antenna pattern calculation unit 104 determines whether or not a current time corresponds to a timing of reception of the control frames 601 (step S4-5). If the current time obtained from the time acquisition unit 109 is determined as corresponding to the timing of the control frame reception (Yes to step S4-5), the antenna pattern calculation unit 104 obtains, from the received SNR estimator 108, the estimated received SNR value of the signal received by the terminal 1 from the relay station 2-1 and the estimated received SNR value of the signal received by the terminal 1 from the relay station 2-2 (step S4-6) and calculates the control signal for each phase shifter 121 of the radio signal receiver 101 so that the aperture of the antennas 120 is divided to cause the received SNRs to become equal between the relay stations 2-1 and 2-2 (step S4-7). If, on the other hand, the current time is determined as not corresponding to the timing of the reception of the control frames 601 (No to step S4-5), the antenna pattern calculation unit 104 determines whether or not the current time corresponds to a timing of reception of the data frame 602 from the relay station 2-2 (step S4-8).

If as a result of the determination, the current time corresponds to the timing of the reception of the data frame 602 from the relay station 2-2 (Yes to step S4-8), the antenna pattern calculation unit 104 calculates the control signal for each phase shifter 121 so that all the entire aperture is oriented toward only the relay station 2-2 (step S4-9). If, on the other hand, the current time is determined as not corresponding to the timing of the reception of the data frame 602 from the relay station 2-2 (No to step S4-8), the antenna pattern calculation unit 104 calculates the control signal for each phase shifter 121 of the radio signal receiver 101 so that the entire aperture is oriented toward only the relay station 2-1 (step S4-10). Because of the above series of steps of the antenna pattern calculation unit 104, the terminal 1 can receive the control frame 601 from the relay station 2-1 and the control frame 601 from the relay station 2-2 at the same time by dividing the aperture when receiving the control frames 601, and can also receive the data frame 602 from each of the relay stations 2-1 and 2-2 by using the entire aperture when receiving the data frame 602.

When the relay station addition request 7 has been received by the terminal 1, in order to notify the signal generation unit 111 of the relay station 2 with which the terminal 1 can communicate, the ready-to-communicate relay station determination unit 110 uses the coordinates of the relay station 2 that are obtained by the relay station location acquisition unit 105, the posture information about the terminal 1 that is obtained by the terminal posture acquisition unit 106, the terminal coordinates that are obtained by the terminal coordinate acquisition unit 107, and the estimated received SNR value that is obtained by the received SNR estimator 108 regarding the signal received by the terminal 1 from the relay station 2. The signal generation unit 111 generates the additional-relay-station availability notification 8 describing those relay stations 2 with which the terminal 1 can communicate. The encoder 112 encodes the additional-relay-station availability notification 8 output from the signal generation unit 11. Examples of a code that the encoder 112 can use for encoding include, but not limited to, a convolutional code, an LDPC code, and an RS code. Examples of a modulation method that can be used by the modulator 113 include, but not limited to, QPSK and QAM, among others. The radio signal transmitter 114 includes an antenna with a variable directivity, an LNA, and an upconverter, among others. The radio signal transmitter 114 converts the baseband electrical signal output from the modulator 113 to the RF band signal and emits this additional-relay-station availability notification 8 into space via the transmitting antenna.

Figure 20:
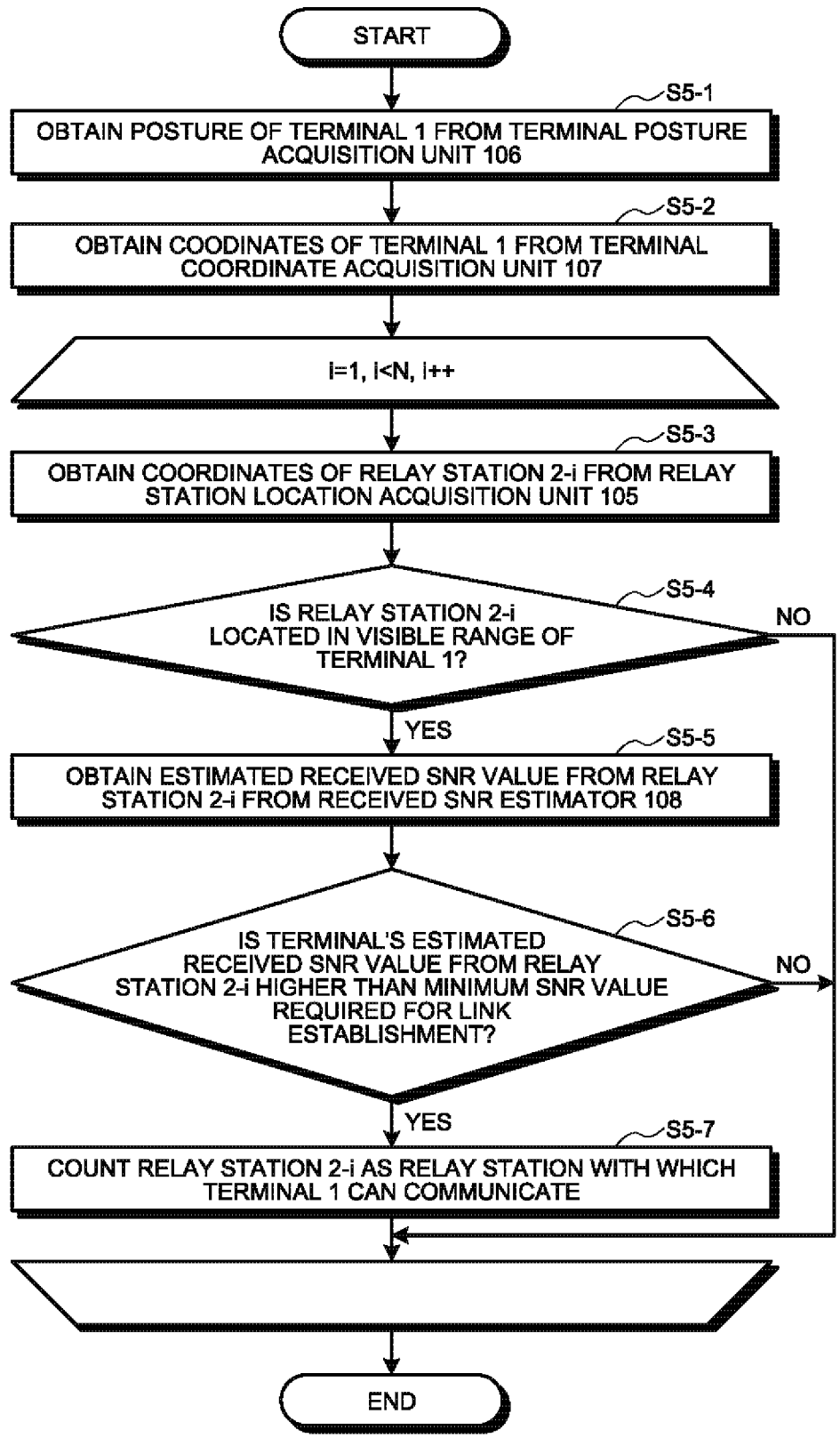
FIG. 20 is a flowchart illustrating an operational example of a ready-to-communicate relay station determination unit according to the embodiment.

A description is hereinafter provided of the ready-to-communicate relay station determination unit 110 that is assumed to operate for extracting, among those N relay stations 2 that are present in the entire communication system, only the relay station(s) 2 with which the terminal 1 can communicate. FIG. 20 is a flowchart illustrating the operational example of the ready-to-communicate relay station determination unit 110 according to the embodiment. The ready-to-communicate relay station determination unit 110 obtains the posture information about the terminal 1 from the terminal posture acquisition unit 106 (step S5-1). The ready-to-communicate relay station determination unit 110 obtains the terminal coordinates from the terminal coordinate acquisition unit 107 (step S5-2). The ready-to-communicate relay station determination unit 110 obtains the location information about the relay station 2-$i$ from the relay station location acquisition unit 105 (step S5-3). Using the location information about the relay station 2-$i$ in combination with the terminal posture information obtained at step S5-1 and the terminal location information obtained at step S5-2, the ready-to-communicate relay station determination unit 110 determines whether or not the relay station 2-$i$ is located in a visible range of the terminal 1 (step S5-4). It is to be noted here that an initial value of i is 1, and i is incremented by one until i reaches N. i is incremented by one after step S5-7 (described later) ends, after the procedure proceeds to branch No of step S5-4, and after the procedure proceeds to branch No of step S5-6. The process from step S5-3 to step S5-7 is repeated until i becomes N.

If the relay station 2-$i$ is determined as being located in the visible range of the terminal 1 (Yes to step S5-4), the ready-to-communicate relay station determination unit 110 obtains, from the received SNR estimator 108, the estimated received SNR value of the signal received by the terminal 1 from the relay station 2-$i$ (step S5-5) and determines whether or not the estimated received SNR value is higher than a minimum SNR value that is required for establishment of a link between the terminal 1 and the relay station 2-$i$ (step S5-6). If the estimated received SNR value is determined as being higher than the minimum SNR value that is required for the establishment of the link between the terminal 1 and the relay station 2-$i$ (Yes to step S5-6), the ready-to-communicate relay station determination unit 110 determines the relay station 2-$i$ as the relay station with which the terminal 1 can communicate (step S5-7). If the relay station 2-$i$ is determined as not being located in the visible range of the terminal 1 (No to step S5-4), the process proceeds to the flow that follows step S5-7. If the estimated received SNR value is determined as being equal to or lower than the minimum SNR value that is required for the establishment of the link between the terminal 1 and the relay station 2-$i$ (No to step S5-6), the process proceeds to the flow that follows step S5-7. As described above, the N relay stations 2 included in the entire communication system 500 each undergo the process from step S5-3 to step S5-7, so that all the relay stations 2 with which the terminal 1 can communicate can be extracted.

In the present embodiment described above, in order to enable the terminal 1 to receive the data frame 602 from each of the relay stations 2-1 and 2-2 with the entire aperture, the control station 4 allocates the data frames 602 to different timeslots. On the other hand, timings of transmission of the control frames 601 which each provide a larger link margin are already known by the system, so that the terminal 1 divides the aperture of the receiving antenna to orient the aperture divisions toward the relay stations 2-1 and 2-2 at the same time, thus achieving simultaneous reception of the control frame 601 from the relay station 2-1 and the control frame 601 from the relay station 2-2. In this way, circuitry for the receiving antenna of the terminal 1 is prevented from being scaled up, eliminating the need for preparation of as many circuits that multiply the elements of the array antenna individually by an excitation coefficient as the number of beams. Moreover, the data frames 602 from the plurality of relay stations can each be received with the entire aperture, so that the terminal 1 can prevent a reduction in beam gain. Reduction of the decrease in beam gain enables prevention or reduction of a decrease in throughput of the terminal 1.

The above configurations illustrated in the embodiment are illustrative of content of the present invention, can be combined with other techniques that are publicly known and can be partly omitted or changed without departing from the gist of the present invention.

REFERENCE SIGNS LIST

1, 1-1 to 1-L terminal; 2, 2-1 to 2-*m* relay station; 3, 3-1 to 3-*m* base station; 4 control station; 5 landline network; 6, 6-1, 6-2 signal; 7 relay station addition request; 8 additional-relay-station availability notification; 9 relay station addition notification; 10 relay station disconnection notification; 101 radio signal receiver; 102 demodulator; 103 decoder; 104 antenna pattern calculation unit; 105 relay station location acquisition unit; 106 terminal posture acquisition unit; 107 terminal coordinate acquisition unit; 108 received SNR estimator; 109 time acquisition unit; 110 ready-to-communicate relay station determination unit; 111 signal generation unit; 112, 310 encoder; 113, 311 modulator; 114, 203, 203-1 to 203-*j*, 312 radio signal transmitter; 120, 120-1 to 120-*p* antenna; 121, 121-1 to 121-*p* phase shifter; 122 switch; 123, 123-1 to 123-*q* receiver module; 201, 201-1 to 201-*k* radio signal receiver; 202 switching unit; 204 controller; 301 radio signal receiver; 302 demodulator; 303 decoder; 304 IF with control station; 305 IF with landline network; 306 signal generation unit; 307 transmit timing controller; 308 transmission buffer; 309 forward link data amount measurement unit; 401 IF with base station; 402 forward link data amount acquisition unit; 403 relay station count determination unit; 404 additional-relay-station determination unit; 405 channel allocation storage unit; 406 channel allocation determination unit; 500 satellite communication system; 601 control frame; 602 data frame; 611 transmit timing information; 700 control circuitry; 700*a* processor; 700*b* memory; 801 relay station ID list; 802 estimated received SNR value; 901 ID of relay station to add; 1001 ID of relay station to disconnect.

The invention claimed is:

1. A communication system comprising:
a terminal, and a relay station comprising first processing circuitry to transmit, to the terminal, a control frame in a timeslot that is shared with another relay station that transmits another control frame to the terminal in the shared timeslot, and a data frame in a timeslot that is not shared with the another relay station,
wherein the terminal includes an array antenna including an aperture and a processor to calculate antenna patterns of the array antenna, the antenna patterns including dividing the aperture of the array antenna to correspondingly orient each of the aperture divisions toward each of the plurality of the relay stations when receiving the control frame from each of the plurality of the relay stations using a same timeslot, and orienting the aperture toward one of the plurality of relay stations at a time when receiving the data frame from each of the plurality of the relay stations using different timeslots.

2. The communication system according to claim 1, further comprising
a control station comprising:
second processing circuitry,
to obtain a forward link data amount for the terminal that is connected with the relay station; and
to determine, by using the data amount, a number of one or more relay stations to be connected to the terminal.

3. The communication system according to claim 2, wherein the second processing circuitry of the control station further determines, by using a load condition and identification information of each of the one or more relay stations connectable to the terminal, which of the relay stations is to be connected as an addition to the terminal.

4. The communication system according to claim 2, wherein the second processing circuitry of the control station further determines a timeslot for a control frame and a timeslot for a data frame while taking into account a propagation delay that is caused by distances that are different among a plurality of the relay stations.

5. The communication system according to claim 1, wherein the plurality of relay stations each transmits a signal to the terminal including a control frame and a data frame, and a control station to control connection between the terminal and each of a plurality of the relay stations, the control station comprising: second processing circuitry to obtain a forward link data amount for the terminal that is connected with the relay station and to determine, by using the data amount, a number of one or more relay stations to be connected to the terminal.

* * * * *